United States Patent
Li et al.

(10) Patent No.: US 12,015,541 B2
(45) Date of Patent: Jun. 18, 2024

(54) METHOD AND SYSTEM FOR LOAD-BALANCED TRAFFIC GROOMING IN IP OVER QUASI-CWDM NETWORK

(71) Applicant: SOOCHOW UNIVERSITY, Suzhou (CN)

(72) Inventors: Yongcheng Li, Suzhou (CN); Jiaqi Zhou, Suzhou (CN); Gangxiang Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/195,548

(22) Filed: May 10, 2023

(65) Prior Publication Data

US 2023/0291678 A1   Sep. 14, 2023

Related U.S. Application Data

(63) Continuation of application No. PCT/CN2022/101008, filed on Jun. 24, 2022.

(30) Foreign Application Priority Data

Oct. 19, 2021   (CN) .......................... 202111216113.1

(51) Int. Cl.
*H04L 47/22*   (2022.01)
*H04L 45/02*   (2022.01)
(Continued)

(52) U.S. Cl.
CPC ............ *H04L 45/122* (2013.01); *H04L 45/02* (2013.01); *H04L 47/122* (2013.01); *H04L 47/22* (2013.01)

(58) Field of Classification Search
CPC ........ H04L 45/02; H04L 47/122; H04L 47/22
See application file for complete search history.

(56) References Cited

U.S. PATENT DOCUMENTS

| | | | |
|---|---|---|---|
| 9,820,020 B2* | 11/2017 | Ou | ......................... H04L 41/122 |
| 2014/0099119 A1* | 4/2014 | Wei | ...................... H04J 14/0267 |
| | | | 398/79 |
| 2017/0331580 A1* | 11/2017 | Shen | ................... H04J 14/0227 |

FOREIGN PATENT DOCUMENTS

| | | |
|---|---|---|
| CN | 103595634 A | 2/2014 |
| CN | 108199959 A | 6/2018 |
| CN | 114039920 A | 2/2022 |

OTHER PUBLICATIONS

Tang et al., Electronic Traffic Grooming in Dedicated Path Protected IP over Elastic Optical Network, 2015, OSA.*

(Continued)

*Primary Examiner* — Lance Leonard Barry
*Assistant Examiner* — Kidest Mendaye
(74) *Attorney, Agent, or Firm* — SZDC Law PC

(57) ABSTRACT

The invention provides a method for load-balanced traffic grooming in an IP over Quasi-CWDM network, including the steps of: inputting a network topology, a set of service traffics between nodes in node pairs and a null route, and when selecting one of the node pairs from the set of service traffics and establishing a traffic request between the nodes in the node pair, deleting the virtual link for which the corresponding light path has no sufficient remnant capacity in an IP layer of the network; finding the virtual link route having the lowest hop count in the IP layer, and determining whether each virtual link on the route can satisfy the service request by means of traffic grooming; and if yes, adopting the traffic grooming strategy to satisfy the service request; and if not, adopting the wave plane based strategy to establish a light path to satisfy the service request.

7 Claims, 6 Drawing Sheets

(51) Int. Cl.
*H04L 45/122* (2022.01)
*H04L 47/122* (2022.01)

(56) References Cited

OTHER PUBLICATIONS

Jiaqi Zhou et al., "Load Balanced Traffic Grooming in IP over Quasi-CWDM Network" Asia Communications and Photonics Conference 2021, T4A.147 (Mar. 28, 2022).

* cited by examiner

| modulation format | transmission distances (km) |
|---|---|
| BPSK | 4000 |
| QPSK | 2000 |
| 8-QAM | 1000 |

METHOD AND SYSTEM FOR LOAD-BALANCED TRAFFIC GROOMING IN IP OVER QUASI-CWDM NETWORK

This application is a Continuation Application of PCT/CN2022/101008, filed on Jun. 24, 2022, which claims priority to Chinese Patent Application No. 202111216113.1, filed on Oct. 19, 2021, which is incorporated by reference for all purposes as if fully set forth herein.

FIELD OF THE INVENTION

The present invention relates to the technical field of data communication, and more particularly to a method and system for load-balanced traffic grooming in an IP over Quasi-CWDM network.

DESCRIPTION OF THE RELATED ART

In order to meet the increasing traffic demand, numerous researches focus on developing new optical transmission technologies to improve spectrum efficiency. Quasi Coarse Wavelength Division Multiplexing (Quasi-CWDM) network architecture is a cost-effective and spectrum-efficient network architecture with a frequency interval between traditional Coarse Wavelength Division Multiplexing (CWDM) and Dense Wavelength Division Multiplexing (DWDM), for example, 200 GHz or 400 GHz. By adaptively adopting different modulation formats, the Quasi-CWDM architecture still remains flexible in adapting to the transmission rate and transmission distance of the super optical channel.

The document [1] studies the problem of traffic grooming in an IP over Quasi-CWDM network and proposes a Mixed Integer Linear Programming (MILP) model and an effective heuristic algorithm to decide whether to realize signal regeneration in an IP layer or an optical layer. The above research on the problem of traffic grooming in an IP over Quasi-CWDM network is mostly implemented based on the premise that all light paths in the optical layer are established along the shortest route. Although the respective highest-level modulation formats are always selected for all the light paths to maximize the spectrum efficiency, a great number of service requests will converge on a few network links, resulting in network link congestion. In order to balance the traffic load between network links, a light path can be established based on the dynamic routing algorithm. However, in this way, a long-distance route may be selected to establish the light path. Therefore, a low-level modulation may be adopted for the light path, resulting in low spectral efficiency of the Quasi-CWDM network. [1] Shen G, Li Y, Zhao H (2015, May). Quasi-CWDM optical network: cost effective and spectrum efficient architecture for future optical networks. In 2015 International Conference on Optical Network Design and Modeling (ONDM) (pp. 1-6). IEEE.

SUMMARY OF THE INVENTION

In view of this, the present invention aims to address the technical problem of overcoming the problems in prior art by providing a method for load-balanced traffic grooming in an IP over Quasi-CWDM network, in which in the case where adoption of the traffic grooming approach cannot satisfy the service request, the wave plane based strategy is adopted to establish a light path to satisfy the service request, so that the spectrum efficiency is maximized in the Quasi-CWDM network while the maximum number of wavelengths used in the Quasi-CWDM network is reduced, and the traffic loads on the links in the Quasi-CWDM network can be balanced and the variance of the numbers of wavelengths used on the links is reduced.

To address the technical problem mentioned above, the present invention provides a method for load-balanced traffic grooming in an IP over Quasi-CWDM network, including the steps of:

inputting a network topology, a set of service traffics between nodes in node pairs and a null route, and when selecting one of the node pairs from the set of service traffics and establishing a traffic request between the nodes in the node pair, deleting the virtual link for which the corresponding light path has no sufficient remnant capacity in an IP layer of the network topology;

finding the virtual link route having the lowest hop count in the IP layer, and determining whether each virtual link on the found route can satisfy the service request by means of traffic grooming; and if yes, adopting the traffic grooming strategy to satisfy the service request; and if not, adopting the wave plane based strategy to establish a light path to satisfy the service request.

In an embodiment of the present invention, the finding the virtual link route having the lowest hop count in the IP layer includes:

finding the virtual link route having the lowest hop count in the IP layer by using the Dijkstra algorithm.

In an embodiment of the present invention, when adopting the wave plane based strategy to establish a light path, the extended wave plane algorithm is performed to search for the route and a corresponding wavelength is assigned in establishing a light path between the nodes in each node pair.

In an embodiment of the present invention, the adopting the wave plane based strategy to establish a light path includes the following steps:

first step: building a set of wave planes depending on the situation of wavelength occupation for the current network link;

second step: searching for the shortest actual route R' between the service nodes in a pair and selecting the modulation format b' from the set of modulation formats depending on the physical distance of the shortest actual route R';

third step: selecting a wave plane from the set of wave planes, searching for the route R having the shortest distance between the nodes in the pair on the wave plane, determining whether the found shortest route R is equal to the null route, and if not, proceeding to the fourth step, and if yes, continuing to search for the route on the next wave plane, and if all the wave planes have been searched without finding any route R that is not equal to the null route, then blocking this service request;

fourth step: depending on the physical distance of the route R found in the wave plane, selecting the modulation format b from the set of modulation formats, and if b=b', letting the work route equal to the route R and proceeding to the fifth step, otherwise proceeding to the third step and continuing to search the next wave plane; and fifth step: determining whether the work route is equal to the null route, and if not, establishing a light path having the modulation format b along the work route and updating the set of wave planes and adding the light path to the corresponding virtual link in the IP layer, and if yes, blocking this service request.

In an embodiment of the present invention, in the building a set of wave planes depending on the situation of wavelength occupation for the current network link:

the virtual link in any one wave plane k corresponds to the k-th wavelength on the actual fiber link and each node in the wave plane corresponds to a physical node thereof.

In an embodiment of the present invention, the step of building a set of wave planes depending on the situation of wavelength occupation for the current network link includes:

when building the wave plane, first determining whether the corresponding wavelength on each link in the network is occupied, and if yes, removing this link from the wave plane.

In an embodiment of the present invention, in the step of building a set of wave planes depending on the situation of wavelength occupation for the current network link:

the built wave plane includes the set of links for which the corresponding wavelength is not occupied on the network and the set of nodes corresponding to these links.

In an embodiment of the present invention, when searching for the shortest actual route R' between the service nodes in the node pair, it is only necessary to find the shortest route between the nodes in this node pair on the network without having to consider whether the link on the network has sufficient resource to satisfy this service request.

In an embodiment of the present invention, the adopting the traffic grooming strategy to satisfy the service request includes:

always selecting the first light path having sufficient remnant capacity for grooming the IP traffic of the service.

Furthermore, the present invention further provides a system for load-balanced traffic grooming in an IP over Quasi-CWDM network, including:

a traffic request establishment module configured to input a network topology, a set of service traffics between nodes in node pairs and a null route, and when selecting one of the node pairs from the set of service traffics and establishing a traffic request between the nodes in the pair, delete the virtual link for which the corresponding light path has no sufficient remnant capacity in an IP layer of the network topology;

a virtual link determination module configured to find the virtual link route having the lowest hop count in the IP layer, and determine whether each virtual link on the found route can satisfy the service request by means of traffic grooming;

a traffic grooming module configured to, if yes, adopt the traffic grooming strategy to satisfy the service request; and a light path establishment module configured to, if not, adopt the wave plane based strategy to establish a light path to satisfy the service request.

The technical solution of the present invention described above has the following advantages over prior art.

In the present invention, in the case where adoption of the traffic grooming approach cannot satisfy the service request, the wave plane based strategy is adopted to establish a light path to satisfy the service request, so that the spectrum efficiency is maximized in the Quasi-CWDM network while the maximum number of wavelengths used in the Quasi-CWDM network is reduced, and the traffic loads on the links in the Quasi-CWDM network can be balanced and the variance of the numbers of wavelengths used on the links is reduced.

BRIEF DESCRIPTION OF THE DRAWINGS

In order to make the content of the present invention easier to be understood clearly, the present invention will be explained in further detail below according to specific embodiments of the present invention and with reference to the accompanying drawings, in which.

DETAILED DESCRIPTION OF THE PREFERRED EMBODIMENTS

The present invention will be further described below with reference to the drawings and specific embodiments, so that those skilled in the art can better understand the invention and implement it. However, the listed embodiments should not be taken as limitation of the present invention.

Figure 1:
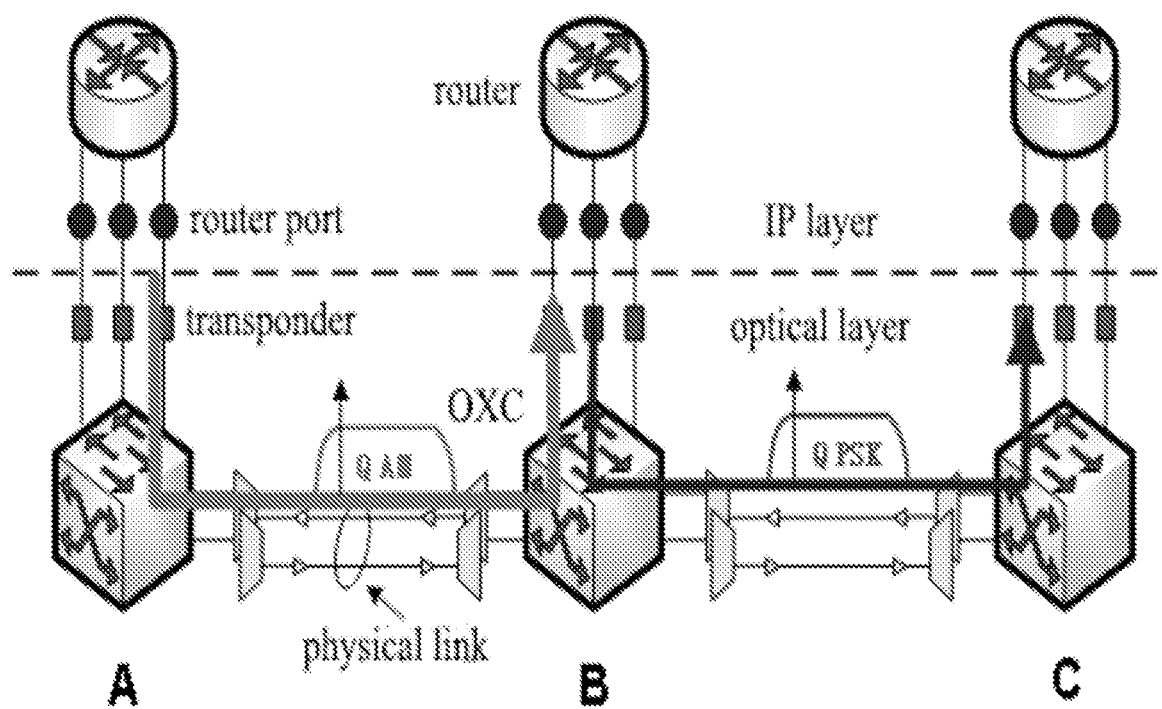
FIG. 1 is a schematic structural view of an IP over Quasi-CWDM network architecture according to the present invention.

First, an IP over Quasi-CWDM network architecture is to be introduced. As shown in FIG. 1, this architecture includes an IP layer and a Quasi-CWDM optical layer. The IP layer includes a router node and a virtual link. The optical layer includes a ROADM node and a fiber link. Each node on the network consists of a pair including a core router and a ROADM node. The core router is connected to the ROADM node through a short-range optical interface that supports Quasi-CWDM to establish a super optical channel. The ROADM node here has exactly the same architecture as the node in a DWDM network at present, except that the AWG and WSS included support Quasi-CWDM spectrum interval.

Figure 2:
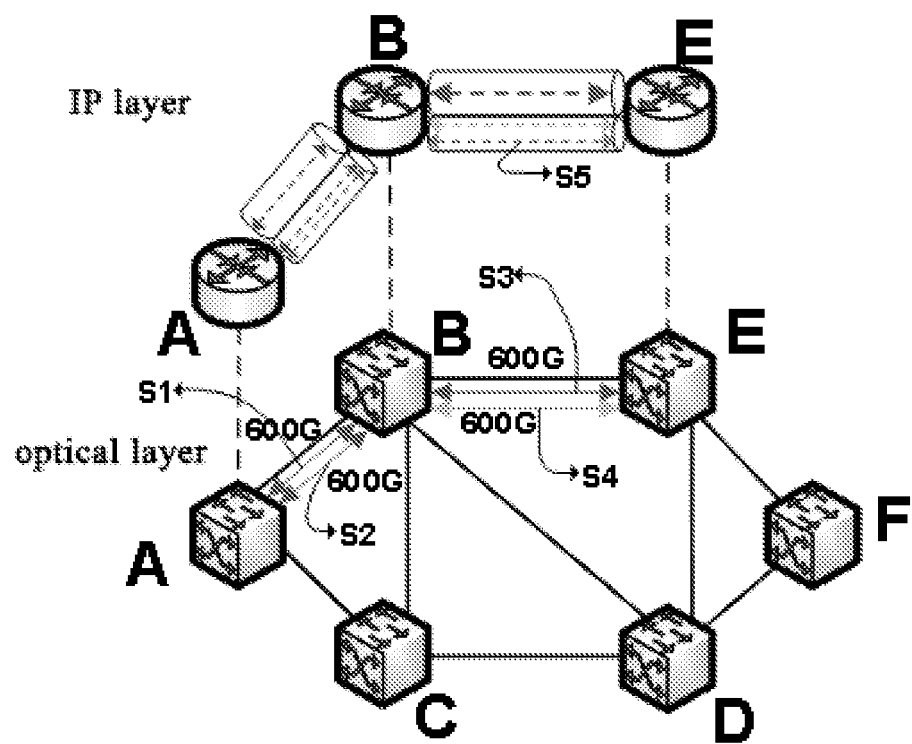
FIG. 2 is a schematic view of a traffic grooming scenario A that impacts the network spectrum efficiency.
Figure 3:
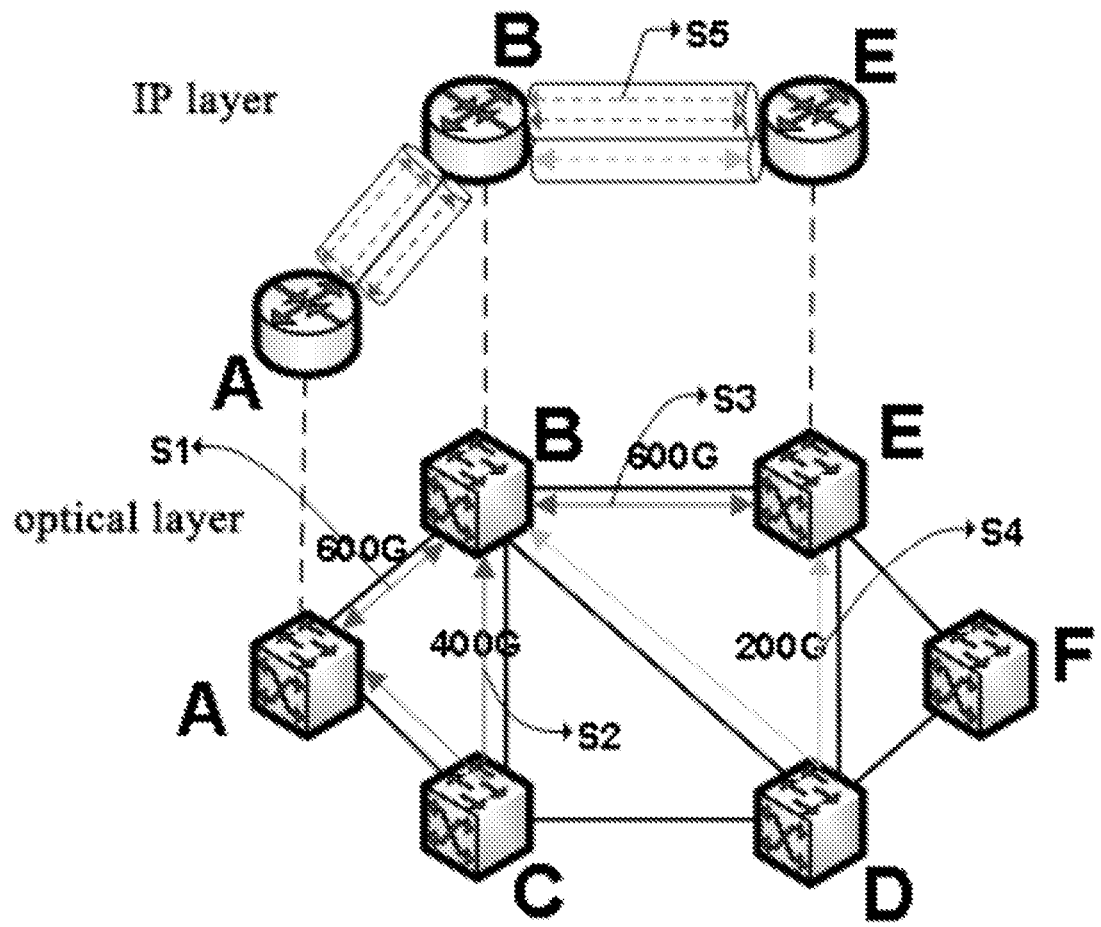
FIG. 3 is a schematic view of a traffic grooming scenario B that impacts the network spectrum efficiency.
Figures 4, 5:
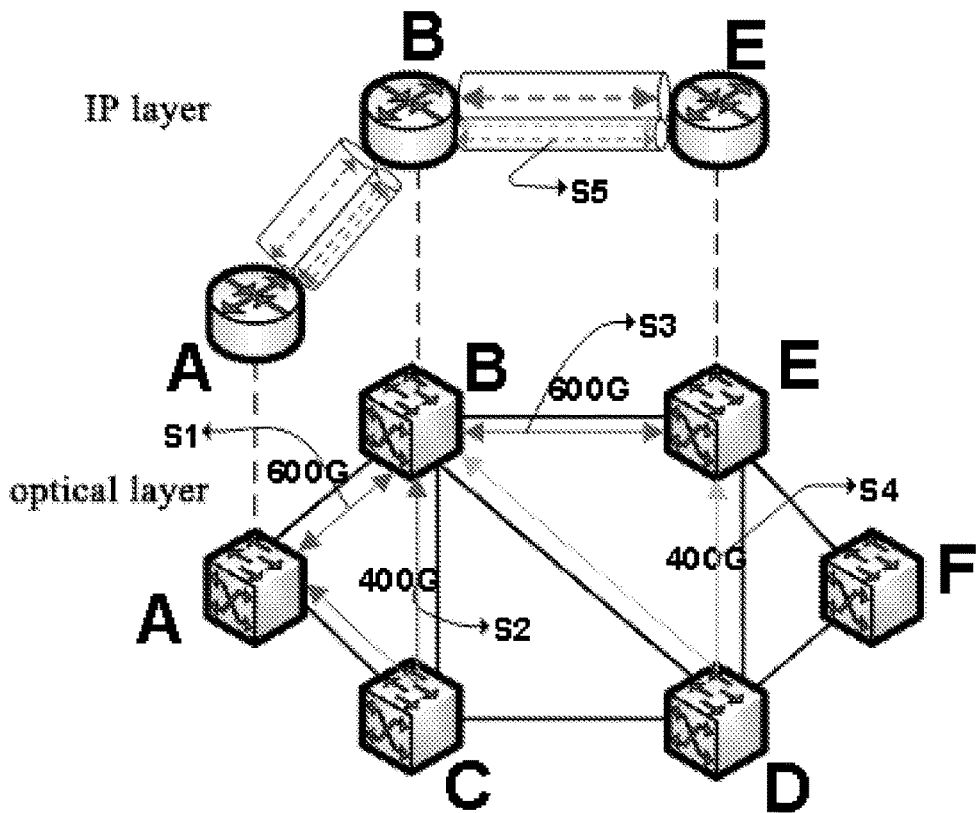
FIG. 4 is a schematic view of a traffic grooming scenario C that impacts the network spectrum efficiency.
FIG. 5 shows the simulation test data.

In the following, FIGS. 2 to 4 illustrate by way of an example how different traffic grooming scenarios impact utilization of spectrum in a Quasi-CWDM network having a fixed spectrum interval of 200 GHz. Assume in a network with 6 nodes, there are five service connection requests S1(A-B), S2(A-B), S3(B-E), S4(B-E) and S5(A-E), which require respectively a bandwidth of 500-Gb/s, 250-Gb/s, 500-Gb/s, 200-Gb/s and 100-Gb/s. We consider three different scenarios here. In the scheme A, two light paths along the shortest route A-B are established for S1 and S2. As for S3 and S4, the request is satisfied by two separate light paths along the same shortest route B-E. All the four light paths have the modulation format of 8-QAM and the corresponding capacity of 600 Gb/s. Finally, S5 will be groomed to the light path along the virtual links A-B and B-E in the IP layer. The maximum number of wavelengths used in the network is two, and the total remanent capacity of the light paths already established is 750 Gb/s.

In the scenario B, the request is satisfied by the light path A-B for S1 and the request is satisfied by the light path A-C-B for S2. Similarly, the requests are satisfied by the light paths B-E and B-D-F-E respectively for S3 and S4. As the light paths A-C-B and B-D-F-E have a long route distance, low level modulation formats of QPSK and BPSK are respectively adopted for them. Therefore, the capacity of these two light paths is merely 400 Gb/s and 200 Gb/s. Finally, S5 is groomed to the light path via the routes A-B and B-E. The maximum number of wavelengths used in the network is 1, but the total remnant capacity is merely 150 Gb/s. In the scenario C, four light paths are established via the routes A-B, A-C-B, B-E and B-D-E in the optical layer. The light path B-D-E has a shorter route distance than the light path B-D-F-E and can use a higher level modulation format, i.e., QPSK, with a corresponding capacity of 400 Gb/s. In this scenario, S5 is groomed to the light path via the routes A-C-B and B-D-E. In this network, the maximum number of wavelengths used is still one, and the total remnant capacity is increased to 350 Gb/s. If a new traffic request exists between the nodes A and E and the bandwidth demand is 100 Gb/s, a new wavelength needs to be adopted in the scenario B. In contrast, in the scenario C, the request can be satisfied by the remnant capacity of the virtual link without use of any new wavelength. This example shows the importance of load balance in an IP over Quasi-CWDM network.

First Embodiment

In the following, detailed explanation is first made of a method for load-balanced traffic grooming in an IP over Quasi-CWDM network disclosed by an embodiment of the present invention.

An embodiment of the present invention provides a method for load-balanced traffic grooming in an IP over Quasi-CWDM network, including the following steps:
S100: inputting a network topology, a set of service traffics between nodes in node pairs and a null route, and when selecting one of the node pairs from the set of service traffics and establishing a traffic request between the nodes in the pair, deleting the virtual link for which the corresponding light path has no sufficient remnant capacity in an IP layer of the network topology;
S200: finding the virtual link route having the lowest hop count in the IP layer, and determining whether each virtual link on the found route can satisfy the service request by means of traffic grooming; and if yes, adopting the traffic grooming strategy to satisfy the service request; and if not, adopting the wave plane based strategy to establish a light path to satisfy the service request.

For example, the virtual link route having the lowest hop count can be found in the IP layer by using the Dijkstra algorithm.

In the step S200, when adopting the wave plane based strategy to establish a light path, the extended wave plane algorithm is performed to search for the route and a corresponding wavelength is assigned when establishing a light path between the nodes in each node pair.

Specifically, the adopting the wave plane based strategy to establish a light path includes the following steps:
First step: building a set of wave planes depending on the situation of wavelength occupation for the current network link. The virtual link in any one wave plane k corresponds to the k-th wavelength on the actual fiber link and each node in the wave plane corresponds to a physical node thereof. In building the wave plane, first it is determined whether the corresponding wavelength on each link in the network has been occupied, and if yes, this link is removed from the wave plane. The built wave plane includes the set of links for which the corresponding wavelength has not been occupied on the network and the set of nodes corresponding to these links.

Second step: searching for the shortest actual route R' between the service nodes in a pair and selecting the modulation format b' from the set of modulation formats depending on the physical distance of the shortest actual route R'. In searching for the shortest actual route R' between the service nodes in the pair, it is only necessary to find the shortest route between the nodes in this pair on the network without having to consider whether the link on the network has sufficient resource to satisfy this service request.

Third step: selecting a wave plane from the set of wave planes, searching for the route R having the shortest distance between the nodes in the pair on the wave plane, determining whether the found shortest route R is equal to the null route, and if not, proceeding to the fourth step, and if yes, continuing to search for the route on the next wave plane, and if all the wave planes have been searched without finding any route R that is not equal to the null route, then blocking this service request.

Fourth step: depending on the physical distance of the route R found in the wave plane, selecting the modulation format b from the set of modulation formats, and if b=b', letting the work route equal to the route R and proceeding to the fifth step, otherwise proceeding to the third step and continuing to search the next wave plane.

Fifth step: determining whether the work route is equal to the null route, and if not, establishing a light path having the modulation format b along the work route and updating the set of wave planes and adding the light path to the corresponding virtual link in the IP layer, and if yes, blocking this service request.

In the above, the shortest actual route R' between the service nodes in a pair can be searched for by using the Dijkstra algorithm.

When adopting the traffic grooming strategy to satisfy the service request as described above, the first light path having sufficient remnant capacity is always selected to groom the IP traffic of the service.

To evaluate the performance of the traffic grooming method proposed by the present invention, a simulation test is carried out on two networks that are respectively a network with 6 nodes and 9 links (n6s9) and a network with 14 nodes and 21 links (NSFNET). Assume that each fiber link has a total spectrum of 4000 GHz, and the spectral grid is set to 200 GHz, and accordingly, each fiber link includes 20 wavelengths. For n6s9 and NSFNET, the number of traffics demanded between the nodes in each pair is respectively assumed to be 7 and 2. For n6s9 and NSFNET, the traffic demand is randomly generated in the range of [50, X]Gb/s, in which X is the maximum traffic demand between the nodes in a pair. We consider different values of X to research on their impacts on the wavelength demand and the variance of the numbers of wavelengths used in the links. There are three candidate modulation formats for establishment of the light path, i.e., BPSK, QPSK, and 8-QAM, the transmission distances of which are consistent with the data in FIG. 5.

Figure 6:
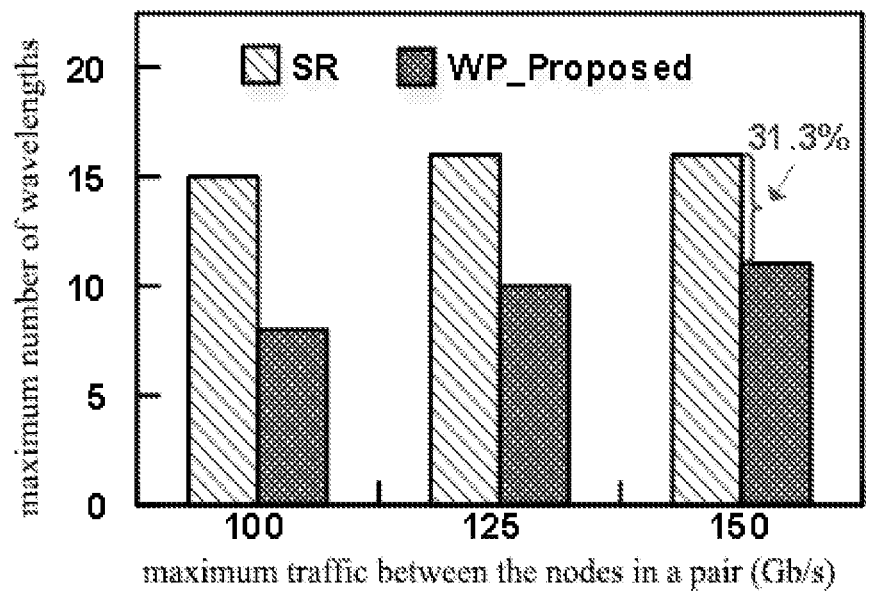
FIG. 6 shows the maximum number of wavelengths used with different strategies in a n6s9 network.
Figure 7:
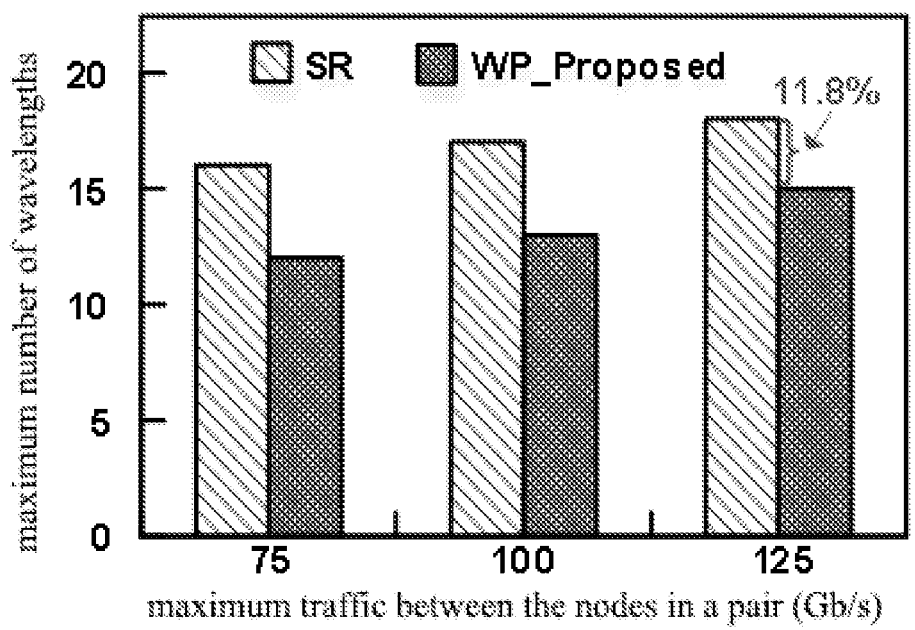
FIG. 7 shows the maximum number of wavelengths used with different strategies in a NSFNET network.

FIGS. 6 and 7 show respectively the maximum number of wavelengths used with different strategies in the n6s9 and NSFNET networks. The legend "SR" corresponds to a strategy in which the shortest route (the actual distance in the optical layer) is always adopted to establish a light path between nodes in each pair. The legend "WP Proposed" corresponds to the wave plane based strategy proposed by the present invention. For the n6s9 network shown in FIG. 6, it can be observed that the performance of the wave plane based strategy proposed by the present invention is much better than that of the SR based strategy, by up to 31.3%. This is because the wave plane based strategy we proposed not only selects the route that can achieve the highest spectrum efficiency, but also involves great flexibility in establishment of the light path. Similar research is also conducted on NSFNET. As can be seen from FIG. 7, the performance of the wave plane based strategy proposed by the present invention is also better than that of the SR based strategy, with the number of wavelength used being reduced by 16.7%.

Figure 8:
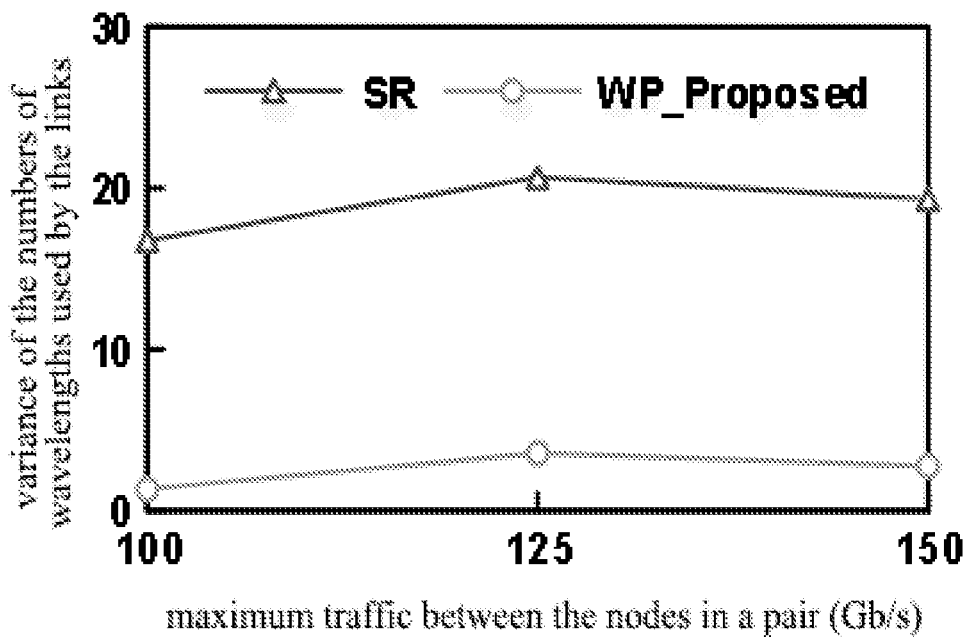
FIG. 8 shows the variance of the numbers of wavelengths used on links with different strategies in a n6s9 network.
Figure 9:
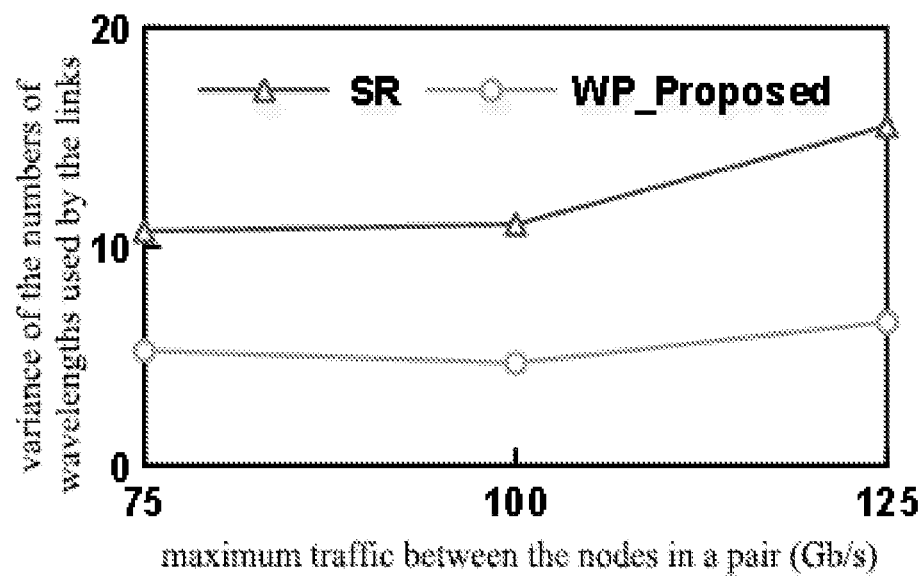
FIG. 9 shows the variance of the numbers of wavelengths used on links with different strategies in a NSFNET network.

The variance of the numbers of wavelengths used by the links in the n6s9 and NSFNET networks in the two strategies is further compared. As can be seen from FIGS. 8 and 9, the variance of the numbers of wavelengths used by the links in the network under the wave plane based strategy according to the present invention is lower than that under the SR based strategy, whether it is in the n6s9 network or the NSFNET network. This observation proves that the wave plane based strategy proposed by the present invention can effectively balance the traffic load between various links in the Quasi-CWDM network.

In the case where adoption of the traffic grooming approach according to the present invention as described above cannot satisfy the service request, the wave plane based strategy is adopted instead to establish a light path so as to satisfy the service request, so that the spectrum efficiency is maximized in the Quasi-CWDM network while the maximum number of wavelengths used in the Quasi-CWDM network is reduced, and the traffic loads on the links in the Quasi-CWDM network can be balanced and the variance of the numbers of wavelengths used on the links is reduced.

Second Embodiment

In the following, the system for load-balanced traffic grooming in an IP over Quasi-CWDM network according to a second embodiment of the present invention is to be introduced. The system for load-balanced traffic grooming in an IP over Quasi-CWDM network described below may be understood with reference to the method for load-balanced traffic grooming in an IP over Quasi-CWDM network described above.

The second embodiment of the present invention provides a system for load-balanced traffic grooming in an IP over Quasi-CWDM network, including:

a traffic request establishment module configured to input a network topology, a set of service traffics between nodes in node pairs and a null route, and when selecting one of the node pairs from the set of service traffics and establishing a traffic request between the nodes in the pair, delete the virtual link for which the corresponding light path has no sufficient remnant capacity in the IP layer of the network topology;

a virtual link determination module configured to find the virtual link route having the lowest hop count in the IP layer, and determine whether each virtual link on the found route can satisfy the service request by means of traffic grooming;

a traffic grooming module configured to, if yes, adopt the traffic grooming strategy to satisfy the service request; and a light path establishment module configured to, if not, adopt the wave plane based strategy to establish a light path to satisfy the service request.

The system for load-balanced traffic grooming in an IP over Quasi-CWDM network according to this embodiment is configured to implement the method for load-balanced traffic grooming in an IP over Quasi-CWDM network described above. Therefore, for specific implementation of this system, reference may be made to the section of embodiment of the method for load-balanced traffic grooming in an IP over Quasi-CWDM network in the above. Accordingly, for the specific implementation of this system, refence may be made to the description in the respective sections of the embodiment and no detailed explanation shall be made herein.

Also, as the system for load-balanced traffic grooming in an IP over Quasi-CWDM network according to this embodiment is configured to implement the method for load-balanced traffic grooming in an IP over Quasi-CWDM network described above, it has effects corresponding to the effects of the method described above, and detailed description shall not be made again here.

It should be understood by those skilled in the art that the embodiments of the present application may be provided as a method, system, or computer program product. Therefore, the present application can take the form of an entirely hardware embodiment, an entirely software embodiment, or an embodiment combining software and hardware aspects. Furthermore, the present application may take the form of a computer program product implemented on one or more computer usable storage media (including but not limited to disk storage, CD-ROM, optical storage, etc.) having computer usable program codes contained therein.

The present application is described with reference to flowcharts and/or block diagrams of a methods, device (system) and computer program product according to embodiments of the present application. It should be understood that each flow and/or block in the flowchart and/or block diagram, and combination of flows and/or blocks in the flowchart and/or block diagram can be realized by computer program instructions. These computer program instructions may be provided to the processor of a general-purpose computer, a special-purpose computer, an embedded processor or other programmable data processing apparatus to produce a machine, so that the instructions executed by the processor of the computer or other programmable data processing apparatus produce means for implementing the functions specified in one or more flows in the flowchart and/or one or more blocks in the block diagram.

These computer program instructions may also be stored in a computer-readable memory that can direct a computer or other programmable data processing apparatus to operate in a specific way, so that the instructions stored in the computer-readable memory produce an article of manufacture including instruction means that implement the functions specified in one or more flows in the flowchart and/or one or more blocks in the block diagram.

These computer program instructions may also be loaded on a computer or other programmable data processing apparatus, so that a series of operation steps are executed on the computer or other programmable apparatus to produce a computer-implemented process, so that the instructions executed on the computer or other programmable apparatus provide steps for realizing the functions specified in one or more flows in the flowchart and/or one or more blocks in the block diagram.

Obviously, the above-mentioned embodiments are only examples for clear explanation, and are not limitations on the implementation. For those of ordinary skill in the art, other changes or variations can be made on the basis of the above description. It is not necessary and impossible to exhaust all the implementations here. And the obvious changes or variations derived therefrom shall fall within the scope of protection of the present invention.

What is claimed is:

1. A method for load-balanced traffic grooming in an IP over "Quasi-Course Wavelength Division Multiplexing" (Quasi-CWDM) network, comprising steps of:

inputting a network topology, a set of service traffics between nodes in node pairs and a null route, and when selecting one of the node pairs from the set of service traffics and establishing a traffic request between the nodes in the node pair, deleting the virtual link for which the corresponding light path has no sufficient remnant capacity in an IP layer of the network topology;

finding a virtual link route having the lowest hop count in the IP layer, and determining whether each virtual link on the found route can satisfy a service request by means of traffic grooming; and if yes, adopting a traffic grooming strategy to satisfy the service request; and if not, adopting a wave plane based strategy to establish a light path to satisfy the service request, wherein when adopting the wave plane based strategy to establish the light path, an extended wave plane algorithm is performed to search for the route, and a corresponding wavelength is assigned when establishing the light path between the nodes in each node pair; and wherein the adopting the wave plane based strategy to establish the light path comprises steps of:

step 1: building a set of wave planes depending on the situation of wavelength occupation for a current network link;

step 2: searching for a shortest actual route R' between the service nodes in a pair and selecting the modulation format b' from the set of modulation formats depending on a physical distance of the shortest actual route R';

step 3: selecting a wave plane from the set of wave planes, searching for a route R having the shortest distance between the nodes in the pair on the wave determining whether a found shortest route R is equal to the null route, and if not, proceeding to step 4, and if yes, continuing to search for the route on a next wave plane, and if all the wave planes have been searched without finding any route R that is not equal to the null route, then blocking the service request;

step 4: depending on the physical distance of the route R found in the wave plane, selecting a modulation format b from the set of modulation formats, and if b=b', letting a work route equal to the route R and proceeding to step 5, otherwise proceeding to the step 3 and continuing to search a next wave plane; and step 5: determining whether the work route is equal to the null route, and if not, establishing the light path having the modulation format b along the work route and updating the set of wave planes and adding the light path to the corresponding virtual link in the IP layer, and if yes, blocking the service request.

2. The method for load-balanced traffic grooming in an IP over Quasi-CWDM network of claim 1, wherein the finding the virtual link route having the lowest hop count in the IP layer comprises: finding the virtual link route having the lowest hop count in the IP layer by using the Dijkstra algorithm.

3. The method for load-balanced traffic grooming in an IP over Quasi-CWDM network of claim 1, wherein in the step of building a set of wave planes depending on the situation of wavelength occupation for the current network link: the virtual link in any one wave plane k corresponds to the k-th wavelength on the actual fiber link and each node in the wave plane corresponds to a physical node thereof.

4. The method for load-balanced traffic grooming in an IP over Quasi-CWDM network of claim 1, wherein the step of building a set of wave planes depending on the situation of wavelength occupation for the current network link comprises: when building the wave plane, first determining whether the corresponding wavelength on each link in the network is occupied, and if yes, removing the link from the wave plane.

5. The method for load-balanced traffic grooming in an IP over Quasi-CWDM network of claim 4, wherein in the step of building a set of wave planes depending on the situation of wavelength occupation for the current network link: the built wave plane includes a set of links for which the corresponding wavelength is not occupied on the network and the set of nodes corresponding to these links.

6. The method for load-balanced traffic grooming in an IP over Quasi-CWDM network of claim 1, wherein when searching for the shortest actual route R' between the service nodes in the node pair, it is only necessary to find the shortest route between the nodes in the node pair on the network without having to consider whether the link on the network has sufficient resource to satisfy the service request.

7. The method for load-balanced traffic grooming in an IP over Quasi-CWDM network of claim 1, wherein the adopting the traffic grooming strategy to satisfy the service request comprises: always selecting the first light path having sufficient remnant capacity for grooming the IP traffic of the service.

* * * * *